N. L. HEINZ.
MANUFACTURE OF SULFURIC ACID.
APPLICATION FILED NOV. 29, 1909.

1,057,149.

Patented Mar. 25, 1913.

Witnesses:
R. J. Jacker
Addaline Pinkerton

Inventor:
Nicholas L. Heinz
By Jno. H. Whipple
Atty.

UNITED STATES PATENT OFFICE.

NICHOLAS L. HEINZ, OF LA SALLE, ILLINOIS.

MANUFACTURE OF SULFURIC ACID.

1,057,149.

Specification of Letters Patent.   Patented Mar. 25, 1913.

Application filed November 29, 1909.   Serial No. 530,361.

*To all whom it may concern:*

Be it known that I, NICHOLAS L. HEINZ, of La Salle, in the county of Lasalle and State of Illinois, have invented a certain new and useful Improvement in the Manufacture of Sulfuric Acid, of which the following is a specification.

My invention relates to the chamber process in which, as usually carried out, an excess of oxygen and nitrogen is supplied to the system by air introduced into the chambers and passed thence with the gases through the entire apparatus, the quantity of air admitted being sufficient to supply an excess of from 6% to 8% of oxygen in the gases over what is consumed, in order to effect the practical working of the process throughout the system. This dilutes the gases too much. The excess has to be carried or forced through the entire system. The dilution causes too great speed of the gases through the chambers and greatly retards the reaction of the gases.

It is the object of my improvement to provide a cure for this defectiveness; and I have attained this object by supplying the oxygen only as required in the different parts of the apparatus by introducing smaller quantities of air at intervals along the system not using any excess at any part thus avoiding too much dilution of the gases and introducing into and passing through the system much less air than heretofore and obtaining a higher efficiency in the working of the process.

The accompanying drawings represent diagrammatically an apparatus suitable for carrying my improved process into effect.

Figure 1:
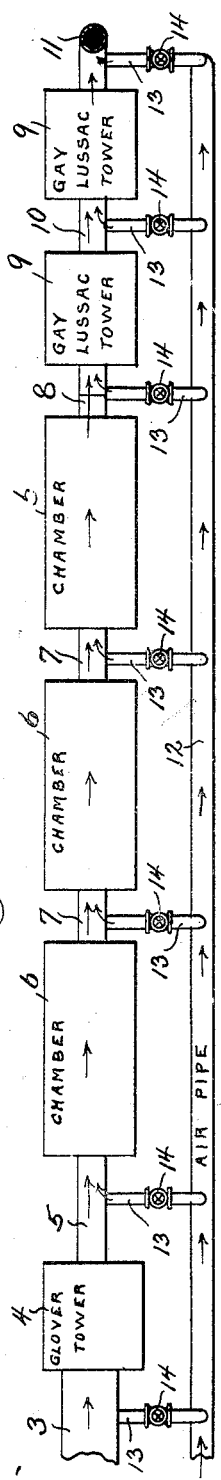
Figure 2:
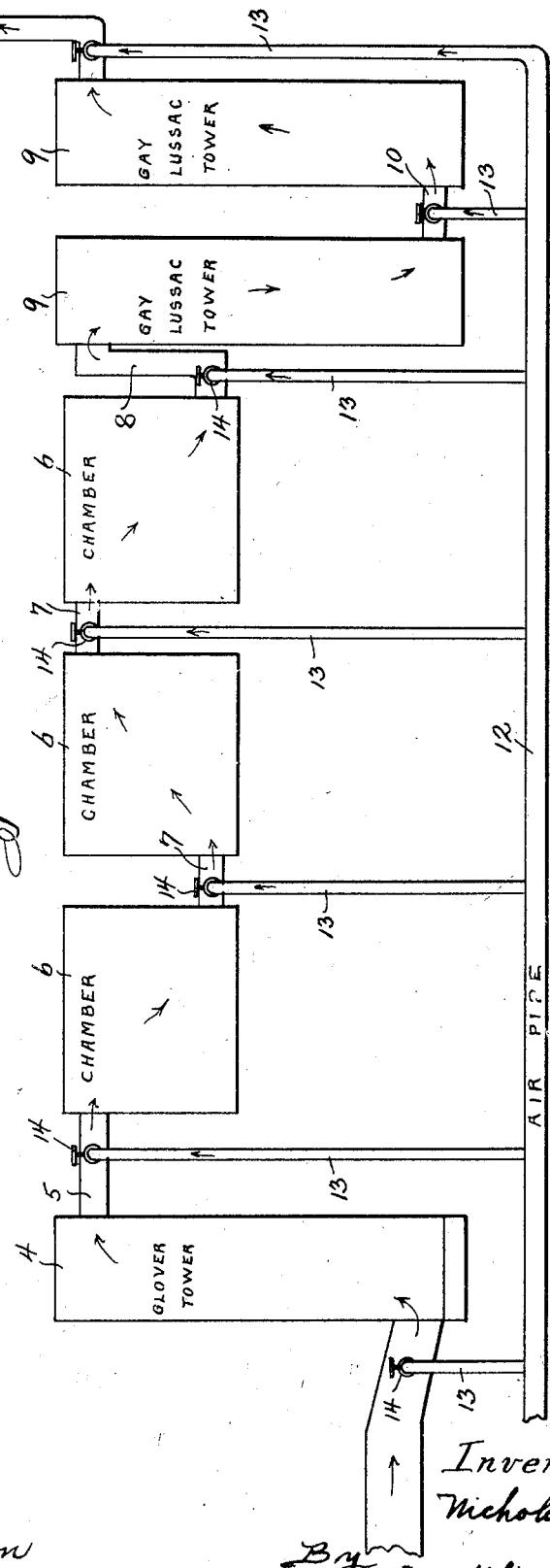

Figure 1 shows a plan view and Fig. 2 a side elevation.

Similar numerals marked on the drawings refer to like parts in both views.

The numeral 3 indicates a part of a flue or pipe leading from a sulfur burner (not shown) to the Glover tower 4, which is connected by a flue 5 to the first of a train of chambers 6 provided with connecting flues 7. The last chamber is connected by a flue 8 with a pair of Gay-Lussac towers 9 joined at the bottom by a flue 10 and terminating in an exit flue 11.

The parts thus far described are all of ordinary form and their construction and operation are well known and understood by those skilled in the art.

The novel part of the apparatus consists in an air pipe 12 connected with a blower, or source of compressed air (not shown), the pipe being extended from the blower along below the chambers and to the farther side of the last Gay-Lussac tower, and being provided with branches 13 of smaller pipe communicating with the flues 3, 5, 7, 8, 10, and 11, and having valves 14, by means of which the flow of air from the branches to their several connections may be regulated. By means of the valved branches 13 and their connections with the pipe 12 and with the chamber flues, as shown, it is rendered practical to distribute the quantity of air used and introduce it at intervals into the several chambers in just the amount required to supply the desired amounts of oxygen at intervals to each of the chambers individually throughout the system. Also to check the speed of movement of the gases in the system and obtain an increase in the reactions of the gases, with higher efficiency than heretofore, so far as I am aware. I may thus use less oxygen than heretofore, so far as I am aware, distribute the quantity taken and introduce it at many intervals into the current or moving mass of sulfurous gases so as to avoid material increase of speed or dilution of the gases while undergoing the process of oxidation.

What I claim is:—

1. In the manufacture of sulfuric acid by the chamber process, the improvement which consists: in distributing and introducing at intervals, the oxygen to be used for oxidizing the sulfurous gases passing with nitrous gases and steam in the chambers, by admitting atmospheric air into the chambers at such intervals and in such regulated quantities as to maintain a uniform pressure and movement of the gases within the chambers and to supply an amount of oxygen equal to that consumed by the reaction of the gases.

2. In the manufacture of sulfuric acid by the chamber process, the improvement which consists: in treating the current of nitrous, sulfurous gases and steam passing in the towers and chambers of the system with such regulated quantities of atmospheric air introduced at such different points along the current and at such times as to maintain a uniform pressure and movement of the gases in the chambers and supply thereto an amount of oxygen equal to that consumed by the reaction of the gases.

NICHOLAS L. HEINZ.

Witnesses:
J. M. GEIB,
G. MARIS.